United States Patent
Gibson et al.

(10) Patent No.: US 7,052,587 B2
(45) Date of Patent: May 30, 2006

(54) PHOTOELECTROCHEMICAL DEVICE AND ELECTRODE

(75) Inventors: Thomas L Gibson, Utica, MI (US); Nelson A Kelly, Sterling Heights, MI (US)

(73) Assignee: General Motors Corporation, Detroit, MI (US)

( * ) Notice: Subject to any disclaimer, the term of this patent is extended or adjusted under 35 U.S.C. 154(b) by 406 days.

(21) Appl. No.: 10/608,509

(22) Filed: Jun. 27, 2003

(65) Prior Publication Data

US 2004/0262154 A1    Dec. 30, 2004

(51) Int. Cl.
*C25B 11/00*    (2006.01)

(52) U.S. Cl. ............ 204/290.03; 204/242; 204/290.01; 204/291

(58) Field of Classification Search ........... 204/290.01, 204/290.03, 291, 242
See application file for complete search history.

(56) References Cited

U.S. PATENT DOCUMENTS

| | | | |
|---|---|---|---|
| 4,266,338 A * | 5/1981 | Chen et al. ................. | 29/623.2 |
| 4,466,869 A | 8/1984 | Ayers | |
| 4,492,743 A * | 1/1985 | Howe ......................... | 429/111 |
| 4,511,638 A | 4/1985 | Sapru et al. | |
| 4,534,099 A * | 8/1985 | Howe ......................... | 438/98 |
| 4,544,473 A | 10/1985 | Ovshinsky et al. | |
| 4,545,883 A | 10/1985 | Ovshinsky et al. | |
| 4,650,554 A * | 3/1987 | Gordon ....................... | 205/340 |
| 4,656,103 A | 4/1987 | Reichman et al. | |
| 4,698,234 A | 10/1987 | Ovshinsky et al. | |
| 4,737,379 A | 4/1988 | Hudgens et al. | |
| 4,778,579 A | 10/1988 | Levy et al. | |
| 4,859,532 A | 8/1989 | Oyama et al. | |
| 4,891,330 A | 1/1990 | Guha et al. | |
| 4,954,182 A | 9/1990 | Ovshinsky et al. | |
| 5,103,284 A | 4/1992 | Ovshinsky et al. | |
| 5,180,690 A | 1/1993 | Czubatyj et al. | |
| 5,231,047 A | 7/1993 | Ovshinsky et al. | |
| 5,670,224 A | 9/1997 | Izu et al. | |
| 5,879,828 A | 3/1999 | Debe et al. | |

(Continued)

FOREIGN PATENT DOCUMENTS

WO    WO2005036570    4/2005

OTHER PUBLICATIONS

Deng and Schiff, 2002, "*Amorphous Silicon Based Solar Cells,*" chapter separately published on Xunming Deng's website: http://www.physics.utoledo.edu/~dengz/papers/deng03a.pdf. Also published in 2003 by Deng and Schiff. Chapter 12, pp. 505-565 in *Handbook of Photovoltaic Engineering,*, ed. A. Luque & S. Hegedus, by John Wiley & Sons, Ltd., no month available.

(Continued)

*Primary Examiner*—Bruce F. Bell
(74) *Attorney, Agent, or Firm*—Kathryn A. Marra (57) ABSTRACT

In one aspect, the invention provides a photoelectrochemical (PEC) electrode or photoelectrode for use in splitting water by electrolysis. The photoelectrode has an electrically conductive surface in contact with an electrolyte solution. This surface is a doped tin oxide layer, which is in electrical contact with the semiconductor solar cell material of the PEC photoelectrode. In a variation of the present invention, another layer of metal oxide having transparent, anti-reflective, and conductive properties is disposed between the doped tin oxide layer and the semiconductor material.

30 Claims, 3 Drawing Sheets

U.S. PATENT DOCUMENTS

| | | | |
|---|---|---|---|
| 6,063,258 | A | 5/2000 | Sayama et al. |
| 6,087,580 | A | 7/2000 | Ovshinsky et al. |
| 6,136,412 | A | 10/2000 | Spiewak et al. |
| 6,300,558 | B1 | 10/2001 | Takamoto et al. |
| 6,305,442 | B1 | 10/2001 | Ovshinsky et al. |
| 6,319,293 | B1 | 11/2001 | Debe et al. |
| 6,368,668 | B1 | 4/2002 | Kobayashi et al. |
| 6,380,601 | B1 | 4/2002 | Ermer et al. |
| 6,410,180 | B1 | 6/2002 | Cisar et al. |
| 6,423,203 | B1 | 7/2002 | Faita et al. |
| 6,432,284 | B1 | 8/2002 | Narayanan et al. |
| 6,471,834 | B1 | 10/2002 | Roe et al. |
| 6,519,951 | B1 | 2/2003 | Ovshinsky et al. |
| 6,521,381 | B1 | 2/2003 | Vyas et al. |
| 6,569,298 | B1 | 5/2003 | Merida-Donis |
| 6,610,193 | B1 | 8/2003 | Schmitman |
| 6,666,961 | B1 | 12/2003 | Skoczylas et al. |
| 6,936,143 | B1* | 8/2005 | Graetzel et al. ............ 204/242 |
| 2005/0059186 | A1* | 3/2005 | Kelly et al. ................... 438/73 |

OTHER PUBLICATIONS

Deng et al., 1998, "Study of Sputter Deposition of ITO Films for a-Si:H n-i-p Solar Cells," in Proceedings of 2nd World Conference and Exhibition on Photovoltaic Solar Energy Conversion, 700-703, no month available.

Arcosta et al., 1996, "About the Structural, Optical and Electrical Properties of $SnO_2$ Films Produced by Spray Pyrolysis from Solutions with Low and High Contents of Fluorine," Thin Solid Films, 288, 1-7, no month available.

Proceedings of the 2002 U.S. DOE Hydrogen Program Review NREL/CP-610-32405 entitled, "Photoelectrochemical Systems for Hydrogen Production", authored by Varner et al., 2002, no month available.

"Proceedings of the 2000 Hydrogen Program Review" NREL/CP-570-28890 entitled, "Photoelectrochemical Hydrogen Production", authored by Miller and Rocheleau, 2000, no month available.

"High-efficiency Amorphous Silicon Thin Film Solar Cells" by Dr. Xunming Deng, 2 pages, Toledo website: dengx@physics.utoledo.edu, no/month/year available.

Deng, Liao, Han, Povolny and Agarwal, (2000) "Amorphous Silicon and Silicon Germanium Materials for High-efficiency Triple-junction Solar Cells", pp. 89-95, website: www.clsevier.com/locate/solmat, no month available.

"Pilkington TEC Glass" (1999), 2 pages, product brochure, no month available.

U.S. Appl. No. 11/156,993, filed Jun. 14, 2005, Gibson, et al. HOGEN®RE Hydrogen Generators, Enabling Zero Emissions Hydrogen Supply, Proton Energy Systems® Transforming Energy™, 3 pgs, http://www.protonenergy.com/index.php/html/energysystems/home/Index.html, Jun. 2, 2004.

\* cited by examiner

PHOTOELECTROCHEMICAL DEVICE AND ELECTRODE

FIELD OF THE INVENTION

This invention relates to photoelectrochemical (PEC) devices for the solar photoelectrolysis of water to produce hydrogen.

BACKGROUND OF THE INVENTION

Currently the major process by which hydrogen is produced is by the steam reforming of methane. Another means of making hydrogen is by the electrolysis of water. The electricity required for electrolysis is mainly derived from the electric power grid, and the predominant source of grid electricity, combustion of fossil fuels, generates emissions, such as nitrogen oxides and particulate matter, as well as carbon dioxide. One way to eliminate such emissions is to use solar generated electricity to electrolyze water to make hydrogen. Presently, efforts are directed toward improving the efficiency, durability, and cost of the hydrogen production processes.

However, systems consisting of solar cells to make electricity together with electrolyzers to dissociate water into hydrogen and oxygen are costly compared to producing hydrogen by the steam reforming of methane.

SUMMARY OF THE INVENTION

In one aspect, the invention provides a photoelectrochemical (PEC) electrode or photoelectrode for use in splitting water by electrolysis. The photoelectrode has an electrically conductive surface in contact with an electrolyte solution. This surface is a doped tin oxide layer, which is in electrical contact with the semiconductor solar cell material of the PEC photoelectrode. Such semiconductor solar cell is preferably a triple-junction amorphous silicon (a-Si) solar cell. Electrolyte solutions aggressively attack many kinds of surfaces including some metals and metal oxides by corrosion and dissolution. The doped tin oxide layer is robust with respect to aggressive attack by the electrolyte solution. The doped tin oxide material is a transparent conductive oxide (TCO), thus, it is electrically conductive and transparent. Such doped tin oxide is preferably fluorine doped tin oxide ($SnO_2$:F).

In a variation of the present invention, another layer of metal oxide having transparent, anti-reflective, and conductive properties is disposed between the doped tin oxide layer and the amorphous semiconductor material. This inner metal oxide layer may be less robust with respect to aggressive attack by the electrolytic solution than the doped tin oxide layer. This inner metal oxide layer is deposited on the solar cell before the doped tin oxide layer. Such inner layer is preferably indium-tin oxide (ITO), which is typically used as an antireflection coating. ITO is also a TCO material. Thus, in this embodiment, there are two TCO layers.

In another embodiment, the semiconductor material of the photoelectrode is overlaid with a transparent, anti-reflective, electrically conductive metal oxide layer and such layer is protected by being overlaid with a non-conductive, transparent material, preferably glass, polymer, or plastic which is impervious to the electrolyte solution. The amorphous semiconductor layer has a peripheral surface and an electrically conductive material that in one embodiment is in contact with at least a portion of the peripheral surface of the semiconductor layer and is in contact with the TCO layer. The electrically conductive material preferably consists of a metal, metal polymer composite, or conductive sealant. By this arrangement, an electrically conductive path is provided from the semiconductor layer to the TCO layer and then to the electrically conductive material that is exposed to the electrolyte solution. The transparent insulative layer protects the TCO layer from contact with the aggressive electrolyte solution.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

In one aspect of the present invention, there is provided a photoelectrochemical (PEC) device for electrolysis of water to produce hydrogen. The PEC device comprises a container housing a photoelectrochemical (PEC) electrode (photoelectrode), a counter electrode and an electrolyte solution. In a preferred aspect of the PEC device the TCO-coated photoelectrode is the anode and produces oxygen, while the counter electrode is the cathode and produces hydrogen. The photoelectrode and the counter electrode are spaced apart from one another in the container, and each electrode is in contact with the electrolyte solution. Preferably, the counter electrode comprises a metal such as Pt or Ni that is stable under the reducing conditions at the cathode and has a low overvoltage for hydrogen production. The electrolyte solution comprises a solvent which preferably comprises water, and a solute which preferably comprises a base. In a preferred embodiment the electrolyte is a basic (alkaline) aqueous solution. Use of an acid instead of a base is also possible. An acid is not recommended due to corrosion problems, but use of an acid or neutral salt in the electrolyte solution instead of a base is within the scope of the invention. An external (not in the solution) electrically conductive path is provided between the photoelectrode and the counter electrode.

The photoelectrode comprises a semiconductor layer, typically and preferably triple-junction a-Si, having first and second major surfaces. The first major surface is an electrically conducting substrate. In a preferred arrangement the first major surface is stainless steel (ss) on top of which is deposited a layer of silver, a layer of $ZnO_2$, and then three layers of n-type, i-type, and p-type semiconductor materials (see Deng and Schiff, 2003, "*Amorphous Silicon Based Solar Cells,*" Chapter 12, pages 505–565 in *Handbook of Photovoltaic Engineering*, ed. A. Luque & S. Hegedus, by John Wiley & Sons, Ltd., such chapter separately published on Xunming Deng's website: http://www.physics.utoledo.edu/~dengx/papers/deng03a.pdf in 2002 by Deng and Schiff). The second major surface is a robust transparent conducting and transparent metal oxide layer that is in contact with a first metal oxide layer which comprises a first transparent, anti-reflective, and electrically conductive metal oxide material. A second or outer metal oxide layer comprises a second transparent and electrically conductive material. This second layer is adjacent the second major surface of the semiconductor. The second metal oxide layer is arranged in electrically conductive contact with the first metal oxide layer; and the second metal oxide layer is more stable in basic solution than the first metal oxide layer. Preferably, the second layer forms the electrode surface where evolution of gaseous electrolysis product, typically oxygen, occurs.

In a preferred aspect, the first metal oxide material (first TCO) comprises indium tin oxide, $In_2O_3:SnO_2$, referred to as ITO. The second metal oxide material (second TCO) is fluorine-doped tin oxide ($SnO_2:F$). The $SnO_2:F$ is arranged in electrically conductive contact with the first TCO layer and is between the first TCO layer and the electrolyte solution.

In another related aspect, the invention provides a photoelectrode comprising a semiconductor layer having a first major surface in contact with an electrically conductive substrate and a second major surface in contact with a transparent, electrically conductive doped tin oxide ($SnO_2$) layer; wherein the semiconductor comprises a photovoltaic, a-Si triple junction material.

In another embodiment, the invention provides a photoelectrode comprising a semiconductor layer having a first major surface in contact with an electrically conductive substrate, a second major surface in contact with a transparent electrically conductive metal oxide (TCO) layer. A transparent insulative layer is adjacent the TCO layer, and is disposed between the TCO layer and the electrolyte solution of the PEC device. The semiconductor has a peripheral surface defined by a thickness and an electrically conductive material is in contact with at least a portion of the peripheral surface of the semiconductor layer and is in contact with the TCO layer. The peripheral surface is also referred to as the outer surface or edges. Preferably, the electrically conductive material forms the electrode surface where evolution of gaseous electrolysis product occurs.

Before further describing the invention it is useful to understand the limitations of conventional designs. The production of hydrogen and oxygen via photoelectrolysis occurs in a cell wherein the electrolyte may be acidic, alkaline, or neutral. The arrangement of the cell and design of the electrode will be determined, at least in part, by the nature of the electrolyte. Typically, the generation of hydrogen using a photoelectrochemical cell requires a photoelectrode, and at least one counter electrode to the photoelectrode. Both the photoelectrode and its counter electrode are disposed in a suitable container having an electrolyte, which provides the source of hydrogen, and suitable ionic species for facilitating the electrolysis. The electrochemical cell typically utilizes a metal electrode such as Pt or Ni as the counter electrode.

In one arrangement, when the electrolyte is alkaline and the counter electrode is a metallic cathode, the reaction at the counter electrode is: $2H_2O+2e^- \rightarrow H_2+2OH^-$.

The reaction in the alkaline electrolyte at the photoelectrode which is a photoanode is: $4OH^- \rightarrow O_2+2H_2O+4e^-$.

When the electrolyte is acidic the reactions at the photoanode and at the counter electrode differ from the alkaline case. For example the cathodic reaction is: $2H^++2e^- \rightarrow H_2$. The anodic reaction is: $2H_2O \rightarrow O_2+4H^++4e^-$. Notice that the $H_2$ is produced at the cathode (the electrode where reduction occurs) and $O_2$ at the anode (the electrode where oxidation occurs) in either acidic or basic conditions.

In a preferred system with a basic (alkaline) electrolyte, when the semiconductor photoanode is exposed to light, electrons are excited thereby creating holes in the valence band and free electrons in a conduction band. The electrons produced at the photoanode are conducted through an external conductive path to the counter electrode where the electrons combine with the water molecules in the electrolyte to produce hydrogen gas and hydroxide ions. At the photoanode, the electrons are provided from hydroxyl ions in the solution to fill holes created by the departure of excited electrons from the photoanode, and oxygen is evolved. For optimum performance, the semiconductor utilized in the system has a voltage in the necessary range to split water (1.6 to 2.2 volts) and in the preferred embodiment herein, such a semiconductor comprises a triple-junction photovoltaic type cell formed of amorphous silicon material.

Accordingly, the incident sunlight or simulated sunlight (electromagnetic radiation) absorbed in the semiconductor creates electron/hole pairs. The photo-excited electrons are accelerated toward the n-layer of the semiconductor due to the internal electric field at the p-n junction. The holes at the p-n junction are accelerated toward the p-layer of the semiconductor. When electrons and holes are accelerated with sufficient energy (voltage), they can react at the cathode and anode respectively, with ions present in the aqueous solution. Oxygen is evolved at the photoanode and hydrogen is evolved at the counter electrode (cathode) according to the reactions previously described hereinabove with respect to the alkaline or acidic solutions.

Conventional photovoltaic cells for the conversion of light into electricity are coated with indium-tin oxide (ITO). Such coating on the face of such cells is typically used as an anti-reflective coating and to collect the electric current from all parts of the cell surface, so that individual solar cells can be interconnected to form solar modules and panels. Due to their corrosion, such coatings have not heretofore been found suitable for use in the aggressive environment of an electrolysis cell.

Accordingly, one of the problems faced in optimizing conventional devices is the corrosion of the ITO and subsequent destruction of the semiconductor by the electrolyte. Indium-tin oxide coatings have not yet been developed to withstand the environment at such an interface. We found that when an n-type layer is adjacent to the electrolyte (a so-called pin device), and it is attempted to make hydrogen on the irradiated electrode (cathode), in a reducing type process, degradation of the ITO coating immediately occurs in the electrolyte.

Accordingly, the design of the present invention is based upon having the p-type layer adjacent to the ITO and on having the fluorine-doped tin oxide layer exposed to the electrolyte. This so-called n-i-p device provides a photoanode that can withstand the corrosive anodic production of oxygen. External connection of the anode to a metal counter electrode where hydrogen evolves completes the photoelectrolysis cell. In this preferred cell arrangement, the hydrogen and oxygen production reactions can be physically separated so the gases do not mix.

Because the very aggressive or corrosive reaction of oxygen production is occurring at the n-i-p type electrode (anode) of the present invention, there is a strong tendency for degradation of the ITO coating on the electrode at the electrolyte interface. The present invention addresses this difficulty by a novel design for such electrodes. By the present invention it is possible to use such coated cells in an electrolysis environment because the design of the present invention provides the necessary protection for such exposed ITO-coated electrode surfaces.

Figure 1:
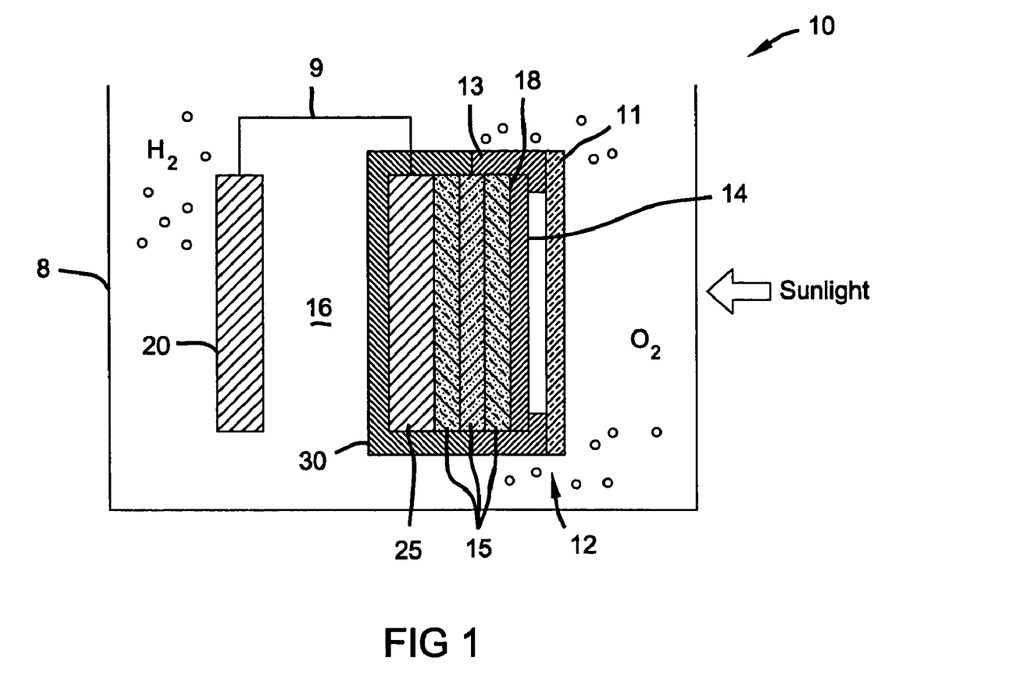
FIG. 1 is a schematic, sectional, representation of a photoelectrochemical (PEC) device which comprises a photoelectrode and counter electrode housed in a container with basic aqueous (alkaline electrolyte) solution; with the PEC electrode having an ITO-coated major surface facing a transparent glass shield.

Referring to FIG. 1, there is shown a photoelectrochemical (PEC) device 10 housed in a container 8. The PEC device 10 comprises a PEC photoelectrode 12 and counter electrode 20 connected by conductive wire 9. Referring to the PEC 10 of FIG. 1, a shield 11 was attached to the front of a photovoltaic amorphous silicon triple-junction photoelectrode 12 using a conductive silver epoxy sealant 13. This is a composite material 13 consisting of a finely divided metallic powder in a polymeric resin binder. Glass shield 11 is arranged to protect the outer indium tin oxide (ITO), transparent conductive oxide (TCO), surface coating 14 and the underlying amorphous silicon (a-silicon) layers 15 of the device from corrosion when immersed in basic electrolytes 16. Non-conductive material 30 arranged with the conductive epoxy 13 and shield 11 formed a container housing the photoelectrode 12. The TCO 14, which consisted of indium-tin oxide (ITO), was applied by vacuum sputtering to the outer surface 18 of the triple-junction amorphous silicon solar cell 15. That is, the ITO was applied to the semiconductor portion of the PEC device 10 by vacuum sputtering as described hereinbelow. Vacuum sputtering is described in Deng et al., 1998, "*Study of sputter deposition of ITO films for a-Si:H n-i-p solar cells,*" in *Proceedings of 2 $^{nd}$ World Conference and Exhibition on Photovoltaic Solar Energy Conversion,* 700–703.

The metal epoxy sealant 13 was applied beneath the protective glass shield window 11 and contacted the conductive ITO layer 14 of photoelectrode 12. Note that the ITO was applied to the photovoltaic cell as an anti-reflection coating 14 and is also used to conduct electric current from the outer (p-layer) of the triple-junction a-Si solar cell 15. Thus, when the PEC device 10 was exposed to simulated solar radiation, the metallic composite sealant 13 very effectively conducted electric current from the solar cell photoelectrode 12 to the electrolyte (for example, aqueous KOH) 16 to split water and evolve hydrogen at the counter electrode 20 and oxygen at the photoelectrode 12. An area of the conductive sealant 13 approximately equal to the area of the a-Si solar cell photoelectrode 12 was left exposed to the electrolyte 16 to act as the anode while a nickel or platinum cathode 20 of approximately equal area was connected to the metal substrate or stainless steel backing 25 which forms the opposite pole (cathode) of the photoelectrode 12. The glass shield window 11 effectively kept the basic electrolyte 16 from contacting and attacking the ITO coating 14 and a-Si materials 15 of the PEC photoelectrode 12. This protective window design extended the lifetime of a PEC electrode immersed in 1 molar aqueous KOH. A PEC electrode with only a standard ITO coating (90% $In_2O_3$, 10% $SnO_2$) lasted about 2 to 3 hours for water splitting in the KOH solution. An indefinitely long lifetime, greater than four days when irradiated with simulated sun light with an estimated irradiance of 120 to 140 $mW/cm^2$ (at which time the test was ended), was observed for the present design of PEC electrode 12 having both glass 11 and the ITO coating 14. Other transparent materials including transparent polymeric coatings and sealants, which can be applied to the front of the PEC electrode 12 more easily and cheaply than glass, can also be used for this shield 11 part of the PEC electrode 12 design. Oxygen bubbles are evolved at the metal composite sealant 13 (anode) of photoelectrode 12 and hydrogen is evolved at the metal cathode 20.

The silver composite 13 was an effective catalytic surface for electrolysis lasting an indefinite time, greater than several days. Severe gray discoloration (silver tarnish) formed on the surface of the silver composite. This suggests other alternative metals may be preferred in the composite 13. Nickel/resin composites, including nickel powder in epoxy and other metal powders in resin binders, are appropriate lower-cost sealants to replace silver epoxy for the purpose of this invention. A mixture of several conductive and catalytic metals in a binder could also be used.

In electrolysis experiments using PEC devices 10, nickel electrodes proved to be very corrosion resistant in KOH solutions and had good catalytic properties for hydrogen evolution from water splitting. Nickel oxides, iron oxides, molybdenum oxides, ruthenium oxides, and other transition metal oxides, and the corresponding metallic transition elements may also be added to the composite sealant (anode) or applied to the metal cathode 20 used as the hydrogen electrode to better catalyze the electrolysis reactions.

Figure 2:
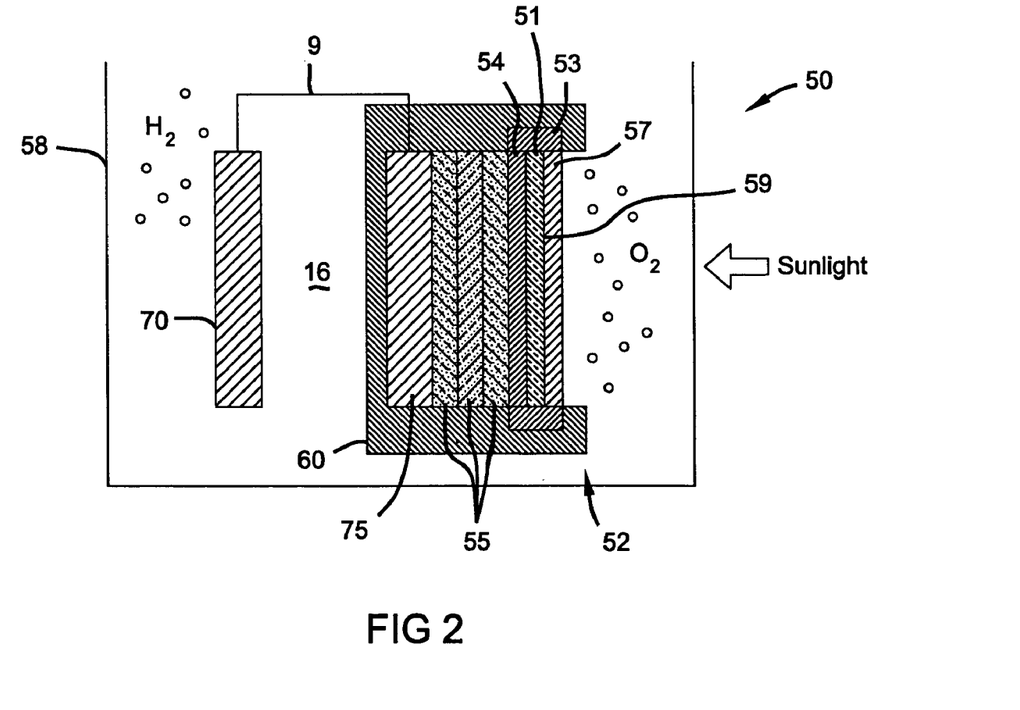
FIG. 2 is a schematic, sectional, representation of a photoelectrochemical (PEC) device which comprises a photoelectrode and counter electrode housed in a container with basic aqueous solution; with the PEC electrode having an ITO-coated major surface facing a doped tin oxide coated transparent glass shield.

Referring to FIG. 2, there is shown a photoelectrochemical (PEC) device 50 housed in a container 58. The PEC device 50 comprises photoelectrode 52 and counter electrode 70 connected by conductive wire 9. Referring to PEC device 50 of FIG. 2, a glass shield 51 was cut just large enough to cover the active face of the amorphous silicon cell electrode 52 and was coated on its outer surface 59 with a thin layer of fluorine doped tin oxide ($SnO_2$:F) 57. The $SnO_2$:F coated glass 51 was substituted for the plain protective glass window 11 in FIG. 1. The $SnO_2$:F, a transparent conductive oxide (TCO) with sheet resistance of 15 ohms per square cm, called TEC 15 glass, was connected to the ITO 54 coating on the PEC photoelectrode 52 by the conductive metallic composite sealant 53 which acted as a waterproof adhesive and sealed the $SnO_2$:F coated glass window 51 to the front of the PEC photoelectrode 52. The formerly exposed areas of the metal epoxy sealant 53 were then covered with an additional, outer layer of insulating sealant (ordinary epoxy) 60 to prevent the metal conductor sealant 53 from coming in contact with the electrolyte 16. The transparent conductive $SnO_2$:F coating 57 was applied on the glass window 51 thus forming the oxygen electrode for splitting water (anode). The $SnO_2$:F coating 57 and glass 51 on electrode 52 proved to have very good corrosion resistance and catalytic capacity when immersed in 1 M aqueous KOH with the photoelectrolysis lasting indefinitely, that is more than 31 days, when irradiated with simulated sun light with an estimated irradiance of 120 to 140 mW/cm². In PEC device 50 of FIG. 2, a nickel metal electrode 70 was connected to the metal backing 75 of the PEC electrode 52 to act as the hydrogen producing electrode (cathode). The complete device (PEC 50, FIG. 2) operated with a steady current density of approximately 10 mA/cm² and evolved bubbles of hydrogen and oxygen continuously during the 31 day test.

In testing both PEC 10, FIG. 1 and PEC 50, FIG. 2, water was split into hydrogen and oxygen by electrolysis in a basic electrolyte (aqueous KOH solution) for 4 days for the system in FIG. 1, wheruopn the test was terminated while the electrode was still working; and for over 31 days for the system in FIG. 2, whereupon the test was terminated while the electrode was still working. Thus, the PEC cells 10 and 50 of FIGS. 1 and 2 continued operating indefinitely without failure due to corrosion of the electrodes 12 and 52. The lifetime of these electrodes in photolytic water-splitting tests (from over 4 to over 31 days) was significantly greater than the lifetime of 2 to 3 hours shown by electrodes coated with standard conventional ITO coating, at about 700 Angstroms thick deposited at 210° C. with 0% oxygen and a sputtering time of 8.2 minutes and an rf energy of 50 W.

The inexpensive materials used in constructing the PECs 10 and 50, FIGS. 1 and 2, and the approximately 10% efficiency of solar energy conversion to hydrogen in preliminary tests meet the requirements for commercial development. This was demonstrated in the lab by electrolysis (water splitting) using PECs 10 and 50, FIGS. 1 and 2 at a potential of 1.6 to 2.3 volts and produced a current density on the ITO coated a-Si photoelectrode of approximately 10 mA/cm² under approximately 1.2 to 1.4 sun conditions (120–140 mW/cm²). This potential and current were supplied entirely by the irradiated thin film triple junction amorphous silicon solar cell 55 within the PEC device photoelectrode 52, which was tested in a lab using solar energy simulated using a calibrated FRS Omega 24-watt metal halide light source (Solarc lamp).

Figure 3:
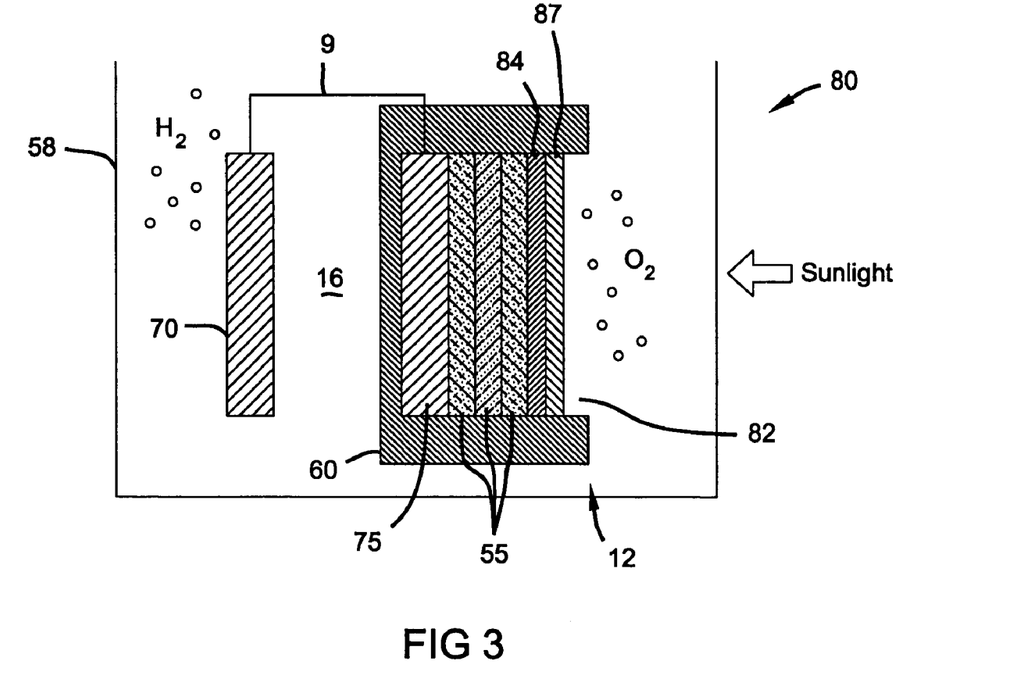
FIG. 3 is a schematic, sectional, representation of a photoelectrochemical (PEC) device which comprises a photoelectrode and counter electrode housed in a container with basic aqueous solution; with the PEC electrode having an ITO-coated major surface, with a doped tin oxide coating overlying the ITO coating. Preferably such doped tin oxide coating is directly deposited on the ITO coating.

Referring to FIG. 3, there is shown a photoelectrochemical (PEC) device 80 housed in a container 58. The PEC device 80 comprises PEC electrode 82 and counter electrode 70 connected by conductive wire 9. The system of FIG. 3 comprises basic components similar to FIGS. 1 and 2. In FIG. 3 similar parts to that contained in FIG. 2 are marked similarity. FIG. 3 differs from FIG. 2 in that the intermediate glass substrate 51 of FIG. 2 is not present in FIG. 3. Therefore, in FIG. 3, the protective doped tin oxide conductive coating 87 is placed directly on the transparent conductive indium tin oxide coating 84. Such application of coating 87 onto coating 84 may be produced by a spray pyrolysis technique.

The technique used to obtain a $SnO_2$:F coating on glass, as in FIG. 2, is not preferred for use to deposit $SnO_2$:F directly on the triple-junction a-Si/ITO device, since the chemical vapor deposition process used for commercially coating glass with $SnO_2$:F requires high temperatures that would most likely degrade the a-Si solar cell electrode. Therefore, it is preferred to use a process such as spray pyrolysis. Such spray pyrolysis can be performed at low temperatures, even as low as the ITO sputtering process (<250° C.). Thus, it is more practical and advantageous to use such a process in manufacturing large sheets of a-Si/ITO/$SnO_2$:F based PEC electrodes since the process could be done in a series of coating steps on a production line.

Spray pyrolysis techniques for preparing $SnO_2$:F coatings are known and one example is described in a paper by Arcosta et al., 1996, "*About the structural, optical and electrical properties of $SnO_2$ films produced by spray pyrolysis from solutions with low and high contents of fluorine,*" *Thin Solid Films,* 288, 1–7. Several methods for producing $SnO_2$:F films as known in the art are described, with spray pyrolysis being the least expensive. In the standard spray pyrolysis method, a spray solution of $SnCl_4$ was dissolved in ethanol together with $NH_4F$, and such solution was sprayed on substrates maintained at about 300° C. This temperature is considered a relative upper limit for a-Si-based PEC electrode. Thus, the spray pyrolysis technique may be useful in producing $SnO_2$:F coatings directly on top of the ITO.

Figure 4:
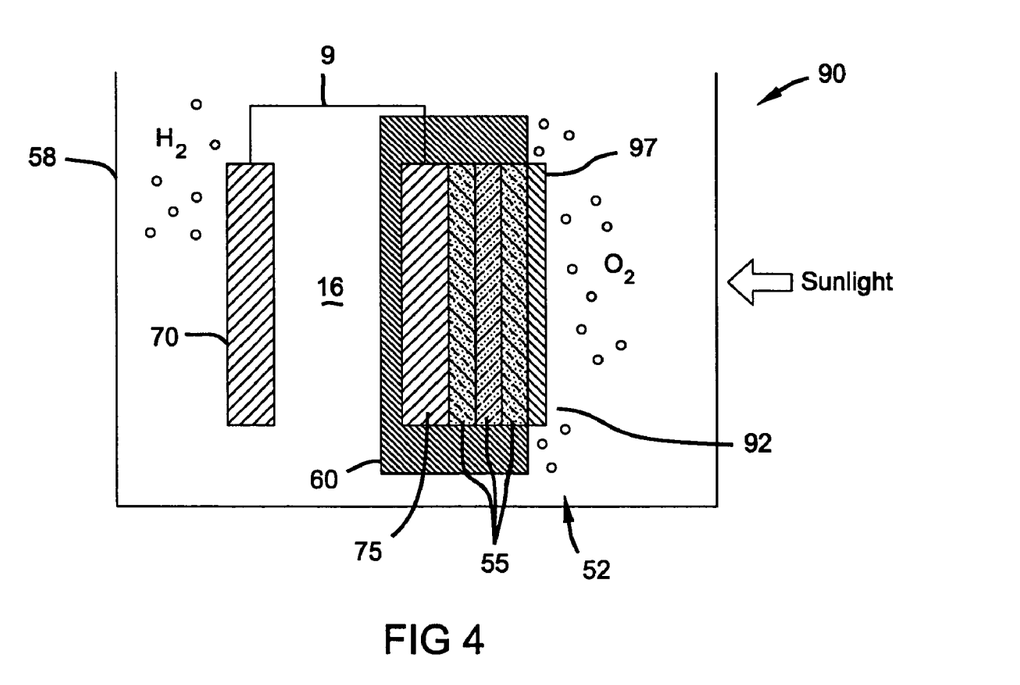
FIG. 4 is a schematic, sectional, representation of a photoelectrochemical (PEC) device which comprises a photoelectrode and counter electrode housed in a container with basic aqueous solution; with the PEC electrode having a doped tin oxide-coated major surface.

In another variation, a PEC photoelectrode 92 of FIG. 4 has doped tin oxide coating 97 applied directly on top of the a-Si semiconductor material 55, and the ITO layer is not included.

Figure 5:
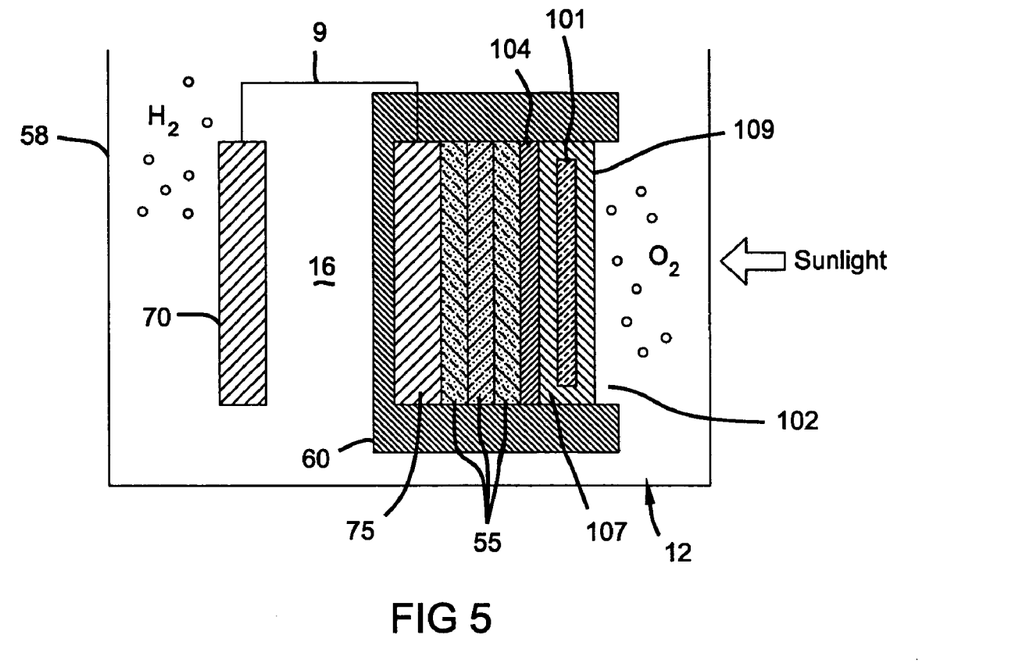
FIG. 5 is a schematic, sectional, representation of a photoelectrochemical (PEC) device which comprises a photoelectrode and counter electrode housed in a container with basic aqueous solution; with the PEC electrode having an ITO-coated major surface and a glass substrate coated on all sides with doped tin oxide overlying the ITO coating.

In still another variation a PEC electrode 102 of FIG. 5 has doped tin oxide coating 107 applied on a transparent substrate 101, such that the substrate 101 is coated preferably on all of its sides, thereby providing a conductive path from the ITO coating 104 to and through doped tin oxide coating 107 and to the exposed surface 109 of coating 107 in contact with the electrolyte solution 16. Thus, all sides for which electrically conductive or antireflective properties are desired are coated. It can be seen in this arrangement, as well as in the arrangement of FIG. 3, that the conductive metal epoxy sealant 53, required in FIG. 2, may be eliminated.

Thus, the doped tin oxide 87 may be applied directly onto the ITO 84 (FIG. 3); directly onto a first surface of glass 51 and then a second surface of glass 51 placed adjacent the ITO 54 (FIG. 2); or the ITO may be omitted and the doped tin oxide 97 placed on the semiconductor material 55 (FIG. 4); and/or the doped tin oxide 102 may be applied to several sides of glass 101 with one doped tin oxide coated surface in contact with the ITO 104 and the other doped tin oxide surface in contact with the electrolyte 16 (FIG. 5).

The doped tin oxide coated transparent glass used in the example of FIG. 2 may be purchased from Pilkington Specialty Glass Products of Toledo, Ohio USA. The particular type of doped tin oxide used here was flourine doped tin oxide and is available under the specification TEC Glass™ that is a trademark of Pilkington. Various designations of the TEC Glass™ are available and the specific type used herein were Pilkington TEC 7 and Pilkington TEC 15 glass coated with flourine doped tin oxide. The flourine doped tin oxide is known in the art as $SnO_2$:F and $SnO_2$-F, with such expressions being used interchangeably. In addition, $SnO_2$:F may be directly applied to the ITO, as in FIG. 3, or directly to the amorphous silicon semiconductor, as in FIG. 4, using a technique such as spray pyrolysis as described above.

Figure 6:
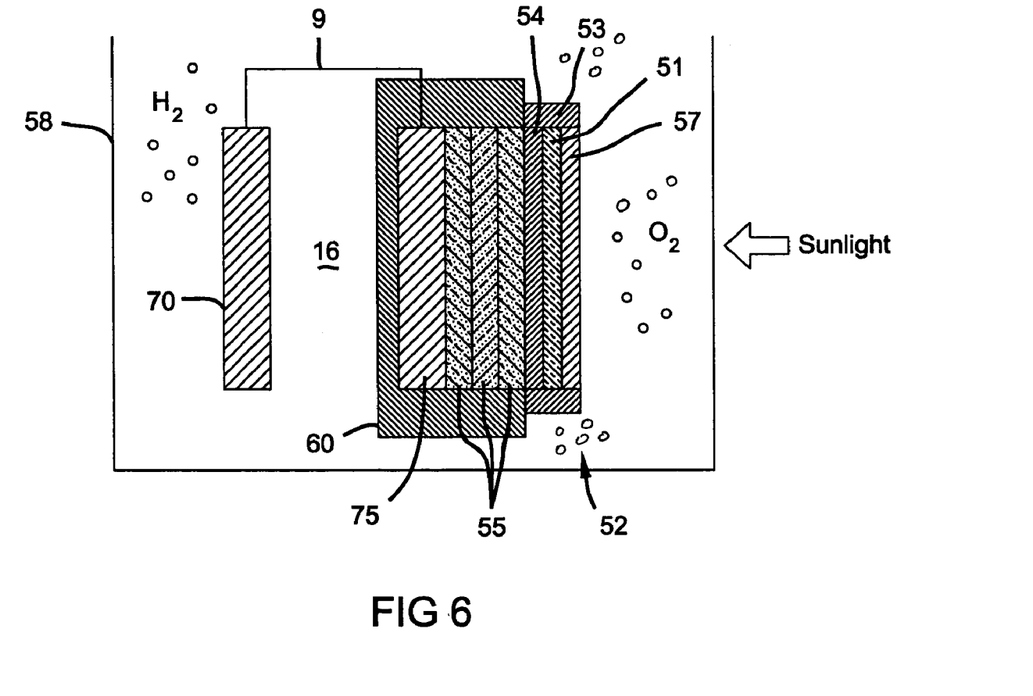
FIG. 6 is similar to FIG. 2 except that the electrically insulative epoxy does not overlie the conductive metal-epoxy sealant.

FIG. 6 is similar to FIG. 2 except that the electrically insulative epoxy 60 does not overlie the conductive metal-epoxy sealant 53. All other part numbers in FIG. 6 are according to the equivalent part in FIG. 2.

There are both electrically conductive and non-conductive epoxy systems that can be used for applications such as the aggressive basic environment of the photoelectrochemical device of the present invention. One such chemically resistant epoxy system which is non-conductive is available from Epoxies, Etc., of Cranston, R.I. and under the description of 20-3004 HV (high viscosity), which is a two component chemically resistant epoxy system with capability of good bonding to a variety of substrates.

The electrically conductive epoxy adhesive coating was also obtained from Epoxies, Etc. and the specific type was 40-3905 which is an electrically conductive system designed for applications requiring good adhesions to a variety of substrates such as metal, ceramic, glass, phenolics, and included a solvent free epoxy system filled with pure silver as the conductive agent.

In the preferred embodiment of the present invention, such PEC cell comprises a photovoltaic amorphous silicon triple junction cell. Such an amorphous silicon-based cell comprises amorphous silicon thin-film materials deposited by a preferred rf plasma enhanced chemical vapor deposition method (PECVD), as described in Deng and Schiff, 2003, "*Amorphous Silicon Based Solar Cells*," Chapter 12, pages 505–565 in *Handbook of Photovoltaic Engineering*, ed. A. Luque & S. Hegedus, by John Wiley & Sons, Ltd., such chapter separately published on Xunming Deng's website: http://www.physics.utoledo.edu/~dengx/papers/deng03a.pdf in 2002 by Deng and Schiff. Amorphous silicon and silicon germanium materials for high efficiency triple-junction solar cells are fabricated by United Solar, ECD, Fuji, University of Neuchatel, BP Solar, Canon, University of Toledo and Sharp. For the experiments described herein, the triple-junction amorphous silicon solar cells were purchased from the University of Toledo (Professor Xunming Deng). The process is conducted in an ultra-high vacuum multi-chamber arrangement, in a system isolated from the environment. Preferably two deposition chambers are used. One chamber is used for the growth of a-Si and a-SiGe materials. By alloying the Si with Ge the band gap of the resulting semiconductor, and thus the production of photoelectrons by light quanta, can be adjusted, so that the solar spectrum is more efficiently used. The other is used for the preparation of n-type, a-Si and p-type microcrystalline silicon (μc-Si) layer. In the method, $Si_2H_6$ $GeH_4$ and hydrogen are used for the deposition of a-Si and a-SiGe materials, respectively. Deposition of p-layers is accomplished using $BF_3$ doping, while deposition of n-layers is accomplished using $PH_3$ doping. The combination of the n- and p-layers, along with an i-layer in between them to improve performance, ultimately forms the a-Si and a-SiGe n-i-p junctions. Even though the triple-junction cells contain Ge, and the amorphous silicon is hydrogenated amorphous silicon (a-Si: H), they are referred to as a-Si cells.

A preferred substrate is stainless steel foil, with or without a silver-zinc oxide back reflector coating, for supporting the silicon-based layers. The top of the silicon based electrode is covered with a layer of ITO deposited by use of an rf sputtering chamber, using various mixtures of $In_2O_3$ and $SnO_2$ having predominately $In_2O_3$ and varying amounts of $SnO_2$, for example 5%, 10% and 15% $SnO_2$. The sputtering conditions for the ITO coating are these: sputtering target=90% $In_2O_3$/10% $SnO_2$; deposition time=50 min; temperature=215° C.; pressure=8 mTorr; atmosphere=argon containing 0% oxygen; radio frequency (rf) power=50 Watts. The thickness of the ITO coating was approximately 4200 Angstroms. The ITO coatings were prepared by a sputtering process as described earlier hereinabove (*Proceedings of $2^{nd}$ World Conference and Exhibition on Photovoltaic Solar Energy Conversion*, 1998) and conducted at the University of Toledo.

The aforesaid solar cells have three pin junctions to utilize a wide range of the solar spectrum using a technique called "spectrum splitting". The upper cell (pin junction) utilizes the ultraviolet and some of the visible region of the solar spectrum to generate photoelectrons. The middle cell uses the visible and some portion of the infrared region, while the bottom cell uses some of the visible more of the infrared region to generate photoelectrons. The three cells are arranged in series so their respective voltages are added together. The bottom layer, meaning that layer adjacent the zinc oxide/silver/stainless steel substrate in the preferred semiconductor of the present invention, is the n-type semiconductor of the bottom cell. The top layer, meaning the layer adjacent to the ITO, is the p-layer of the top cell. There are intermediate i-layers between the n- and p-layers of each cell.

The series electrical arrangement of the aforesaid three cells makes it possible to achieve a potential of over 2 volts suitable for the electrolysis of water. Theoretically, it is possible to electrolyze water at 1.23 volts. With inherent losses, referred to as over voltages, a potential of at least 1.6 volts is needed for water electrolysis. Thus, the approximately 2-volt potential produced by the triple-junction a-Si arrangement is quite satisfactory.

Several types of multijunction solar cells are known for direct conversion of sunlight to electricity in a-Si photovoltaics. Dual-junction a-Si/a-SiGe cell and triple junction a Si/a-SiGe/a-SiGe cells enable a "spectrum splitting" to collect the sunlight, and this achieves higher conversion efficiencies. It is known that a-Si(1.8 eV)/a-SiGe(1.6 eV)/a-SiGe (1.4 eV) triple-junction solar cells are among the most efficient a-Si based cells.

Discussion of the design, construction, and advantages of amorphous silicon solar cells, including triple-junction amorphous silicon solar cells is contained in Deng and Schiff, 2003, "*Amorphous Silicon Based Solar Cells*," Chapter 12, pages 505–565 in *Handbook of Photovoltaic Engineering*, ed. A. Luque & S. Hegedus, by John Wiley & Sons, Ltd., such chapter separately published on Xunming Deng's website: http://www.physics.utoledo.edu/~dengx/papers/deng03a.pdf in 2002 by Deng and Schiff. A review of the basic photoelectrochemical properties of amorphous silicon based structures can be found in Proceedings of the 2002 U.S. DOE Hydrogen Program Review NREUCP-610-32405 entitled, "*Photoelectrochemical Systems for Hydrogen Production*", authored by Varner et al., 2002; and "Proceedings of the 2000 Hydrogen Program Review" NREL/CP-570-28890 entitled, "*Photoelectrochemical Hydrogen Production*", authored by Miller and Rocheleau, 2000.

The invention described here comprises a photoelectrochemical (PEC) device made from an inexpensive triple-junction amorphous silicon (a-Si) solar cell that is protected from corrosion by a durable transparent and electrically conductive material. This design results in a practical method for direct generation of hydrogen by in-situ electrolysis of water. Such a system can potentially produce large quantities of hydrogen much more cheaply by eliminating the elaborate electric collection grid and mounting needed by photovoltaic cells. In PEC devices, greater efficiency is achieved by supplying electrons from the active silicon directly through the shortest distance to catalyst layers deposited on the outside where hydrogen and oxygen are evolved. Each of the three stacked solar cells in the triple-junction device absorbs a portion of the solar spectrum and is used to boost the voltage output of the device to over two volts—more than enough to split water (it takes a minimum of 1.23 volts to split water, and for practical purposes more than 1.6 volts is needed to overcome "overvoltage" effects at the electrodes). Here, a-Si cells are inexpensive compared to crystalline or polycrystalline-silicon and especially compared to highly efficient but very expensive crystalline semiconductor wafers such as GaAs, GaInP$_2$, and AlGaAs. In addition, a variety of bases may be used besides KOH, such as Na$_2$CO$_3$ or NaOH. Use of acids and neutral salts are within the scope of the invention to produce the aqueous electrolyte.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A photoelectrode comprising a semiconductor layer having a first major surface in contact with an electrically conductive substrate, a second major surface in contact with a transparent, electrically conductive metal oxide (TCO) layer, a transparent, electrically conductive doped tin oxide (SnO$_2$) layer adjacent said second major surface, said doped SnO layer arranged in electrically conductive contact with said TCO layer.

2. The photoelectrode of claim 1 wherein said doped SnO$_2$ layer consists essentially of flourine doped tin oxide (SnO$_2$:F).

3. The photoelectrode of claim 1 wherein said doped SnO layer and said TCO layer are spaced apart from one another and an electrically conductive material is arranged to contact both said doped SnO$_2$ layer and TCO layer, providing electrical contact therebetween.

4. The photoelectrode of claim 3 wherein said electrically conductive material comprises conductive metal-epoxy sealant.

5. The photoelectrode of claim 3 wherein an impervious insulative material overlies said electrically conductive material.

6. The photoelectrode of claim 1 wherein said doped SnO$_2$ layer directly overlies said TCO layer thereby providing said electrically conductive contact.

7. The photoelectrode of claim 1 wherein said doped SnO$_2$ layer is co-extensive with said TCO layer.

8. The photoelectrode of claim 1 wherein said doped SnO$_2$ layer is disposed on a non-conductive transparent substrate and said non-conductive transparent substrate is arranged between said TCO layer and said doped SnO$_2$ layer.

9. The photoelectrode of claim 8 wherein an electrically conductive material is disposed on a peripheral surface of said transparent substrate and in contact with said TCO and doped SnO$_2$ layers.

10. The photoelectrode of claim 1 wherein an impervious insulative material overlies peripheral surfaces of said electrically conductive substrate, semiconductor, and TCO layer.

11. The photoelectrode of claim 1 wherein said electrically conductive substrate has a surface facing away from said semiconductor layer, and an impervious insulative material overlies said facing-away surface.

12. The photoelectrode of claim 1 wherein said doped SnO$_2$ layer comprises a transparent substrate having a first major surface facing said TCO and a second major surface opposite said first major surface, a peripheral surface defined by a thickness between said major surfaces of said transparent substrate, doped SnO$_2$ coated on both major surfaces of said transparent substrate and coated on at least a portion of said peripheral surface between said first and second major surfaces of said transparent substrate, thereby providing said electrically conductive contact between said TCO layer and doped SnO$_2$ layer.

13. The photoelectrode of claim 1 wherein said semiconductor layer comprises photovoltaic, amorphous, silicon triple junction material.

14. The photoelectrode of claim 13 wherein said photoelectrode comprises, in order, said electrically conductive substrate comprising ss/Ag/ZnO and said semiconductor comprising n-i-p; wherein said n-layer faces said ZnO, and said p-layer faces said TCO.

15. The photoelectrode of claim 1 wherein said TCO layer consists essentially of indium tin oxide (ITO).

16. The photoelectrode of claim 1, which is a photoanode.

17. The photoelectrode of claim 3 wherein said metal of said metal-epoxy sealant is selected from one group consisting of silver, nickel, platinum, ruthenium, iridium, iron, iron oxide and alloys thereof and mixtures thereof.

18. A photoelectrode comprising a semiconductor layer having a first major surface in contact with an electrically conductive substrate and a second major surface in contact with a transparent, electrically conductive doped tin oxide (SnO$_2$) layer; wherein said semiconductor layer comprises photovoltaic, amorphous, silicon n-i-p material having said doped SnO$_2$ layer in contact with p of said n-i-p.

19. The photoelectrode of claim 18 wherein said doped SnO$_2$ layer consists essentially of fluorine doped tin oxide (SnO$_2$:F).

20. The photoelectrode of claim 18 wherein said semiconductor layer comprises a-Si-nip/nip/nip triple junction material.

21. The photoelectrode of claim 18 wherein said photoelectrode comprises, in order, said electrically conductive substrate comprising ss/Ag/ZnO and said semiconductor comprising n-i-p; wherein said n-layer faces said ZnO, and said p-layer faces said TCO.

22. A photoelectrochemical device for electrolysis of water to produce hydrogen comprising:
a container housing a photoelectrode, a counter electrode and an electrolyte solution, said photoelectrode and said counter electrode spaced apart from one another in said container and each being in contact with said electrolyte solution;
a photoelectrode comprising: a semiconductor layer having a first major surface in contact with an electrically conductive substrate and a second major surface coated with a first conductive layer; said first conductive layer comprising a first metal oxide which is transparent, anti-reflective and electrically conductive; a second conductive layer comprising a second metal oxide which is transparent and electrically conductive; said second conductive layer adjacent to said second major surface and arranged in electrically conductive contact with said first conductive layer; and said second conductive layer being more stable in basic solutions than said first conductive layer;
said counter electrode comprising a metal;
said solution comprising a solvent which comprises water and a solute which comprises a base; and
an electrically conductive path between said photoelectrode and said counter electrode.

23. The photoelectrochemical device of claim 22 wherein said metal of said counter electrode is stable in basic solution and has a low overvoltage for the hydrogen evolution reaction.

24. A photoelectrode comprising: a semiconductor layer having a first major surface in contact with an electrically conductive substrate and a second major surface coated with a first conductive layer; said first conductive layer comprising a first metal oxide which is transparent, anti-reflective and electrically conductive; a second conductive layer comprising a second metal oxide which is transparent and electrically conductive; said second conductive layer adjacent to said second major surface and arranged in electrically conductive contact with said first conductive layer; and said second conductive layer being more stable in basic solutions than said first conductive layer.

25. The photoelectrode of claim 24 wherein said first conductive layer consists essentially of indium tin oxide (ITO).

26. The photoelectrode of claim 24 wherein said second conductive layer comprises fluorine doped tin oxide ($SnO_2$: F).

27. A photoelectrode comprising a semiconductor layer having a first major surface in contact with an electrically conductive substrate, a second major surface in contact with a transparent, electrically conductive metal oxide (TCO) layer, and a peripheral, surface defined by a thickness between said major surfaces of said semiconductor layer;

an electrically conductive material in contact with at least a portion of said peripheral surface of said semiconductor layer and in contact with said TCO layer; and a transparent insulative layer adjacent said TCO layer.

28. The photoelectrode of claim 27 wherein said insulative transparent layer is spaced from said TCO layer thereby forming a gap and said electrically conductive material fills at least a portion of said gap.

29. The photoelectrode of claim 28 wherein said electrically conductive material overlies said peripheral surface of the semiconductor layer and overlies at least a portion of a major surface of said TCO, layer facing said transparent layer.

30. The photoelectrode of claim 27 wherein said TCO layer has a major surface facing said transparent layer and has a peripheral surface, and said electrically conductive material overlies at least a portion of said peripheral and major surfaces of said TCO layer.

* * * * *